United States Patent
Okada et al.

(10) Patent No.: US 7,464,623 B2
(45) Date of Patent: Dec. 16, 2008

(54) DISTRIBUTION EQUIPMENT FOR ROBOT

(75) Inventors: Takeshi Okada, Yamanashi (JP);
Munehiro Jinushi, Yamanashi (JP);
Hidenori Kurebayashi, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 626 days.

(21) Appl. No.: 10/953,278

(22) Filed: Sep. 30, 2004

(65) Prior Publication Data
US 2005/0072261 A1   Apr. 7, 2005

(30) Foreign Application Priority Data
Oct. 3, 2003   (JP)   ............... 2003-346103

(51) Int. Cl.
*B25J 17/00*   (2006.01)
(52) U.S. Cl. .................. 74/490.05; 74/490.06; 901/28; 901/29
(58) Field of Classification Search ............. 74/490.01, 74/490.02, 490.05, 490.06; 901/23, 27, 28, 901/29
See application file for complete search history.

(56) References Cited

U.S. PATENT DOCUMENTS

| | | | |
|---|---|---|---|
| 5,816,107 A | | 10/1998 | Takahashi et al. |
| 6,220,113 B1 * | | 4/2001 | Finsterwalder et al. ... 74/490.02 |
| 7,104,153 B2 * | | 9/2006 | Matsumoto et al. ...... 74/490.02 |
| 2003/0200831 A1 * | | 10/2003 | Matsumoto et al. ...... 74/490.06 |
| 2005/0103148 A1 * | | 5/2005 | Inoue et al. .............. 74/490.02 |
| 2006/0101936 A1 * | | 5/2006 | Inoue et al. .............. 74/490.01 |

FOREIGN PATENT DOCUMENTS

| | | |
|---|---|---|
| DE | 297 20 048 | 3/1999 |
| JP | 63-39416 | 2/1988 |

* cited by examiner

*Primary Examiner*—David M Fenstermacher
(74) *Attorney, Agent, or Firm*—Drinker Biddle & Reath LLP

(57) ABSTRACT

A robot provided with a robot mechanism including a first member and a second member, the first member and the second member being movable relative to each other; and a laying structure for laying an umbilical member in the robot mechanism. The robot includes the umbilical member laid to extend between the first member and the second member; a movable clamp member movably provided in the first member to clamp the umbilical member; and a connecting member for connecting the movable clamp member to the second member in a correlatively movable manner. The connecting member transmits a force generating due to a movement of the second member relative to the first member to the movable clamp member, so as to move the clamp member in the first member.

6 Claims, 12 Drawing Sheets

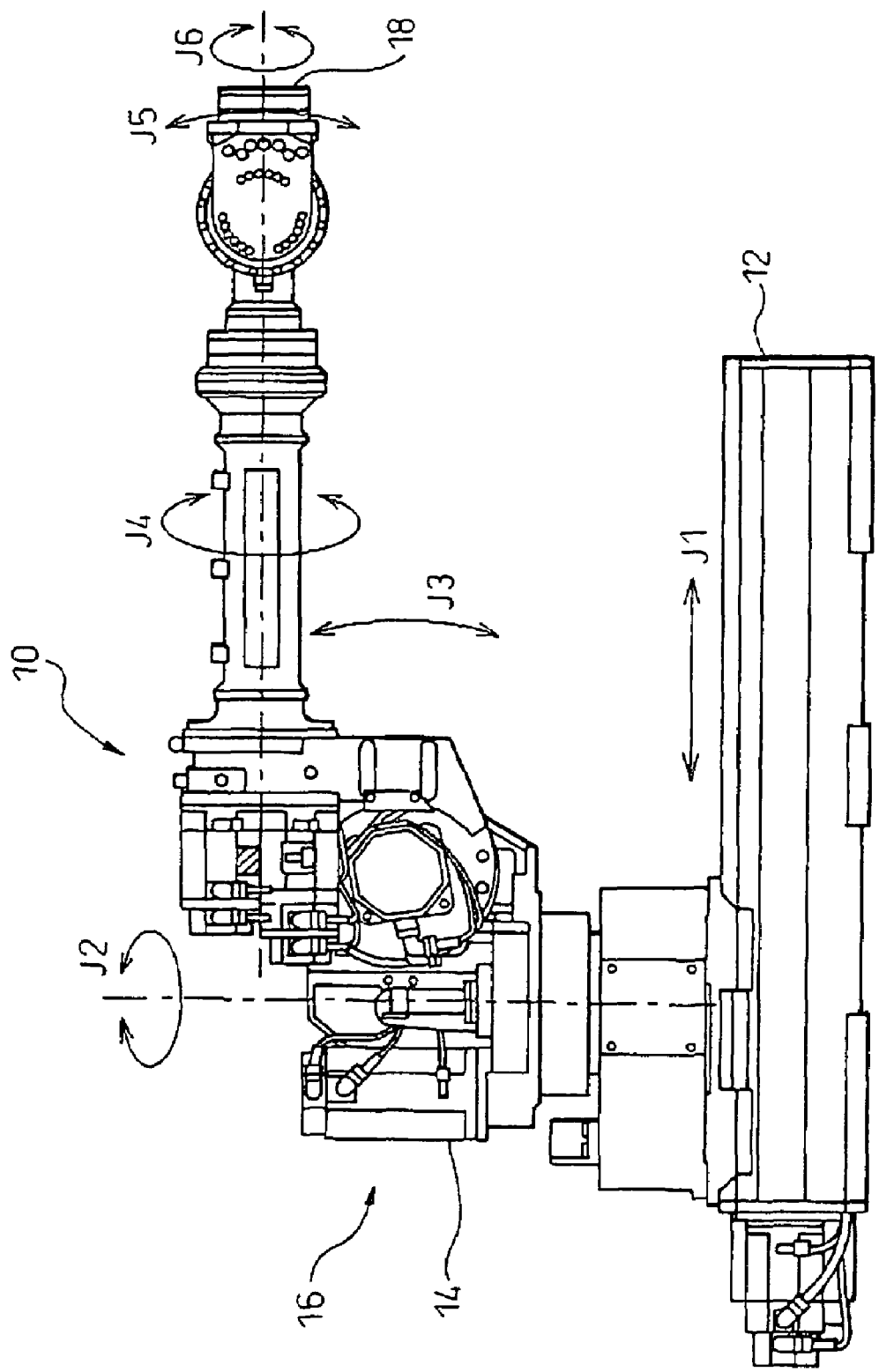

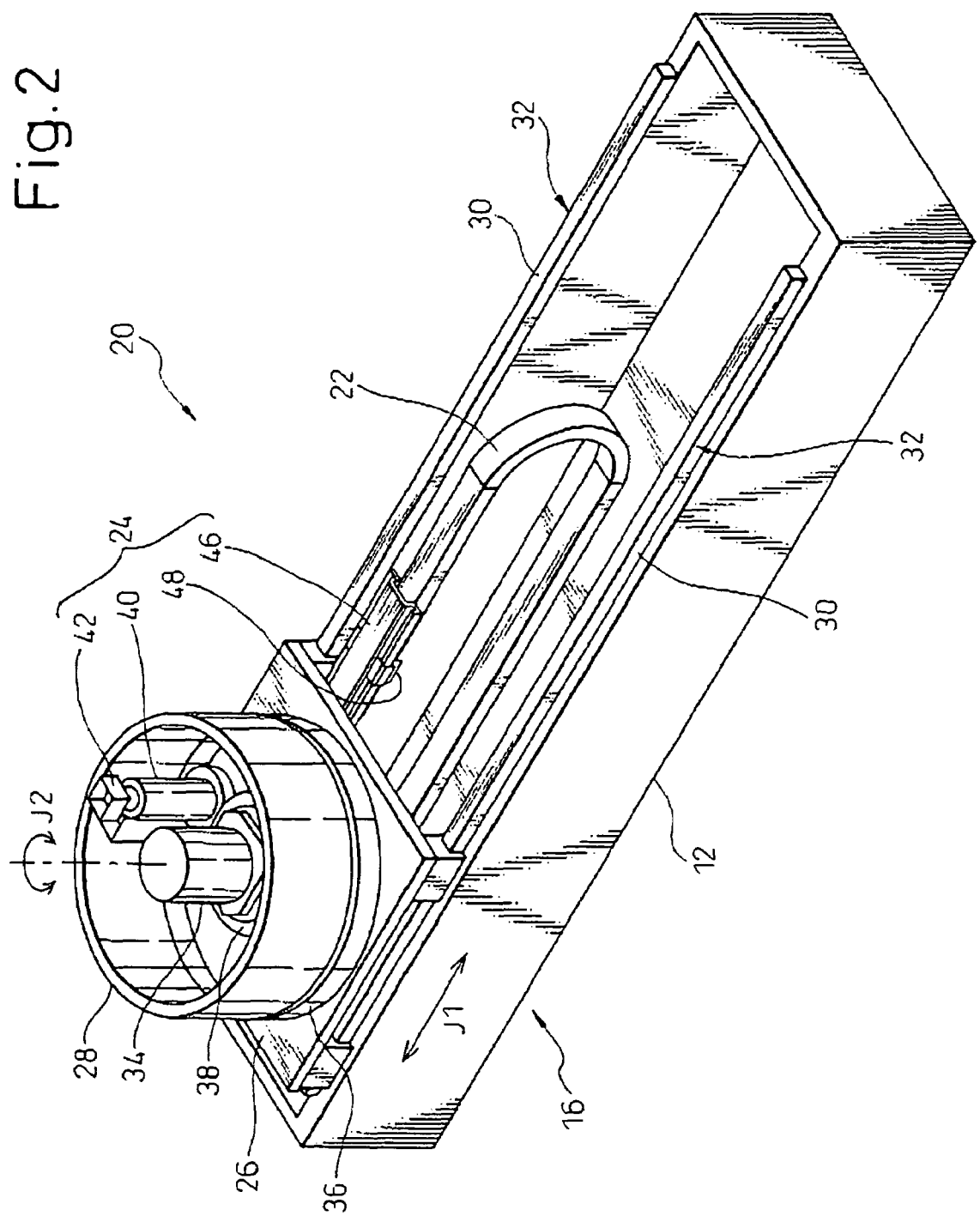

DISTRIBUTION EQUIPMENT FOR ROBOT

BACKGROUND OF THE INVENTION

1. Field of the Invention

The present invention relates generally to a robot and, more particularly, to an improvement in distribution equipment for supplying power, signals, materials or others to a manipulator.

2. Description of the Related Art

In a robot or, especially, an industrial robot, distribution equipment is provided for distributing or communicating various substances (such as electric current, air, inactive gas, water or paint) relating to power, energy, signals, information or materials, for the purpose of the driving control of electric motors in respective control axes in a manipulator, the driving control of an end-effector, the use in the end-effector, the transfer of information to or from various sensors, and so on. In this type of distribution equipment, an umbilical member, such as a cable or a conduit, incorporating signal lines or material feeding lines therein is generally used, and a laying structure is provided, in a robot mechanism including a manipulator, for suitably laying the umbilical member.

In the above-described distribution equipment for the robot, it is required that the umbilical member is not entangled with the manipulator or stretched during the operation of the manipulator. To this end, the conventional laying structure, provided in the robot mechanism, includes a clamp member for clamping the umbilical member at a suitable intermediate position, while providing the umbilical member with a desired slack. In this regard, as the umbilical member is generally laid out between a plurality of members movable relative to each other and across a joint in the manipulator, it is necessary to properly select a position at which the umbilical member is clamped.

For example, in the case where the clamp member is fixedly provided in the robot mechanism, the clamp member is arranged at a position permitting the sufficient slack of the umbilical member, so that the umbilical member is not fully stretcher during a period when the plural members in the robot mechanism are moving relatively. In this case, the reduction in outside dimension of the robot mechanism may be disturbed for the purpose of allowing the larger slack of the umbilical member. Contrary to this, in the case where the clamp member is movably arranged in the robot mechanism, the clamp member can suitably move in correspondence to the relative movement of the plural members in the robot mechanism, whereby it is possible to minimize the slack of the umbilical member between clamped positions and thus to exclude an influence on the outside dimension of the robot mechanism. In this arrangement, however, as the movable clamp member moves under the application of a stretching force to the umbilical member, which results from the relative movement of the plural members in the robot mechanism, the umbilical member may be damaged by the stretching force.

SUMMARY OF THE INVENTION

It is an object of the present invention to provide a robot including distribution equipment for laying an umbilical member between mutually movable plural members in a robot mechanism, wherein the distribution equipment is able to prevent the umbilical member from being damaged during the operation of the robot mechanism and thus to increase the life of the umbilical member, without influencing the outside dimension of the robot mechanism.

To accomplish the above object, the present invention provides a robot comprising a robot mechanism including a first member and a second member, the first member and the second member being movable relative to each other; an umbilical member laid in the robot mechanism and extending between the first member and the second member; a clamp member movably provided in the first member to clamp the umbilical member; and a connecting member for connecting the clamp member to the second member in a correlatively movable manner, the connecting member transmitting a force generating due to a movement of the second member relative to the first member, to move the clamp member in the first member.

In the robot as described above, it is preferred that the connecting member has flexibility.

Also, the movement of the second member for generating the force may be a rotating movement relative to the first member.

The clamp member may be provided in the first member in a linearly movable manner.

Alternatively, the clamp member may be provided in the first member in a rotatable manner.

In this arrangement, the robot may further comprise a support member rotatably supporting the clamp member, the support member being pivotably attached to the first member.

BRIEF DESCRIPTION OF THE DRAWINGS

The above and other objects, features and advantages of the present invention will become more apparent from the following description of preferred embodiments in connection with the accompanying drawings, wherein:

FIG. 1 is a diagrammatic front view showing the appearance of a robot according to a first embodiment of the present invention, and illustrating the operation modes of respective control axes of a robot mechanism;

FIG. 2 is a diagrammatic perspective view showing a peripheral structure of J1 and J2 axes in the robot of FIG. 1;

DETAILED DESCRIPTION

Figure 3A:
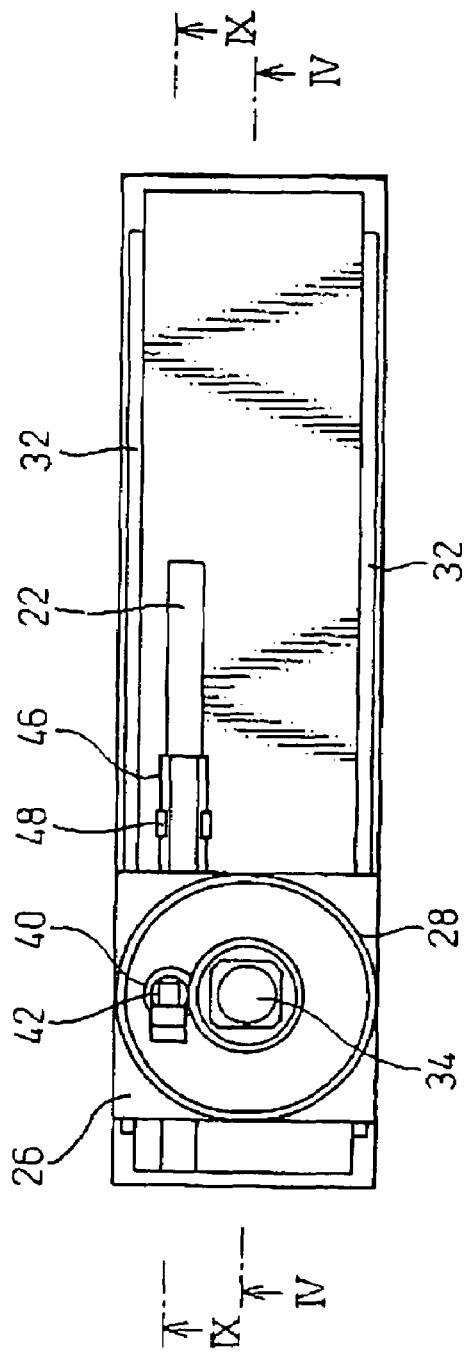
FIG. 3A is a plan view showing the structure of FIG. 2.

The embodiments of the present invention are described below in detail, with reference to the accompanying drawings. In the drawings, the same or similar components are denoted by common reference numerals.

Referring to the drawings, FIG. 1 shows an appearance of a robot 10 according to a first embodiment of the present invention, and FIGS. 2 to 9 illustrate distribution equipment in the robot 10. As shown in FIG. 1, the robot 10 is a six-axis articulated robot, and is provided with a robot mechanism 10 including a base 12 and a manipulator 14 mounted on the base 12 in a movable manner. The robot mechanism 16 includes control axes, referred to as a J1 axis, a J2 axis, a J3 axis, a J4 axis, a J5 axis and a J6 axis in due order from the base 12 to a wrist portion 18 of the manipulator 14, and operates due to the driving action of motors of these control axes under the control of a control section (not shown). The operation modes of the respective control axes are shown by bi-directional arrows, in which the J1 axis is provided for a linear motion and the J2 to the J6 axes are provided for a rotating motion.

In the robot 10, distribution equipment 20 is provided for distributing various substances (such as electric current, air, inactive gas, water or paint) relating to power, energy, signals, information or materials, for the purpose of the driving control of electric motors in respective control axes in the robot mechanism 16, the driving control of an end-effector (not shown) attached to the wrist portion 18 of the manipulator 14, the use in the end-effector, the transfer of information to or from various sensors (not shown), and so on. As shown in FIG. 2, the distribution equipment 20 includes an umbilical member 22 such as a cable or conduit incorporating therein a signal line or a material feeding line and a laying structure 24 arranged in the robot mechanism for suitably laying the umbilical member 22.

In the robot 10 having the above-described configuration, the umbilical member 22 tends to have a relatively large change in the position and orientation thereof, between a first (or linearly moving) member operating in the J1 axis (e.g., a slider 26) and a second (or rotating) member operating in the J2 axis (e.g., a drum 28). Accordingly, the laying structure 24 of the distribution equipment 20 has a characteristic configuration, as described below, in a peripheral region of the J1 and the J2 axes. In this regard, the distribution equipment according to the present invention should not be limited to the illustrated configuration but may be properly used for laying an umbilical member between two members movable relative to each other in a robot mechanism.

In the robot mechanism 16, the base 12 is provided with a pair of linear guides 32 respectively composed of linear rails 30, and the slider 26 is mounted on the linear guides 32 in a linearly movable manner. The operation of the slider 26 is controlled in the J1 axis (i.e., a linear motion control in the J1 axis). In this regard, a driving system in the J1 axis including a servo-motor is not illustrated. An electric motor 34 is mounted on the slider 26 as a driving source in the J2 axis, and the drum 28 is attached to the slider 26 via a bearing unit 36. The output shaft of the electric motor 34 is connected to the drum 28 through a speed reduction unit 38, so that the drum 28 rotates due to the output of the electric motor 34 (i.e., a rotation control in the J2 axis).

Figure 3B:
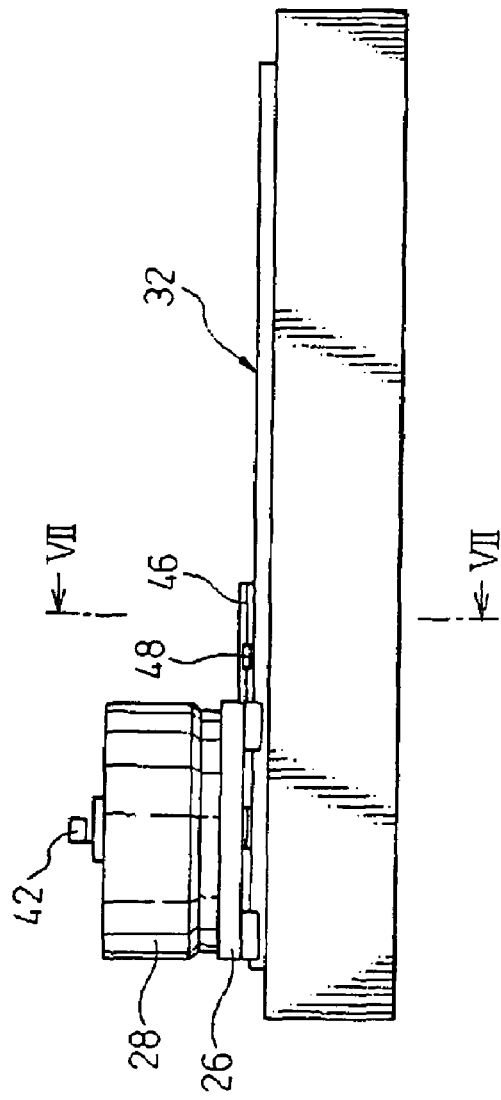
FIG. 3B is a front view showing the structure of FIG. 2.
Figure 4:
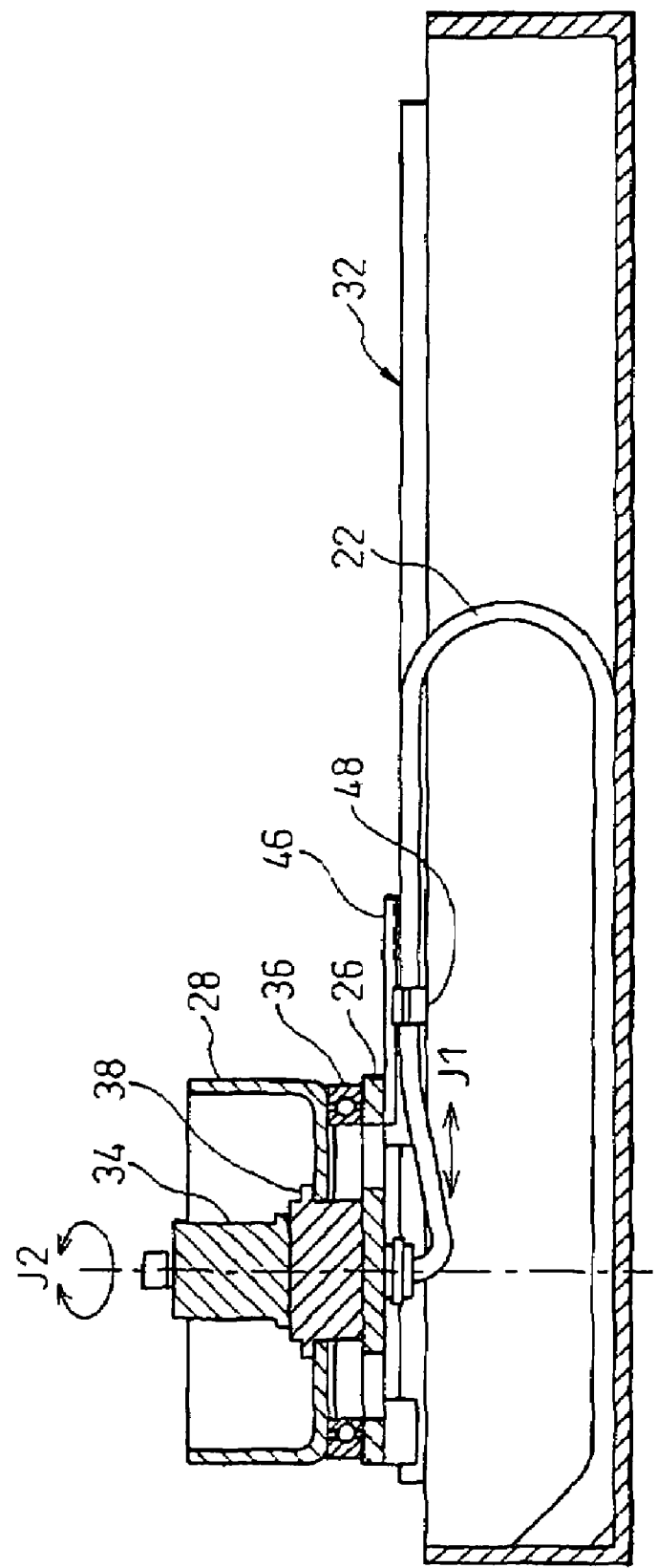
FIG. 4 is a sectional view taken along a line IV-IV in FIG. 3A.

The laying structure 24 of the distribution equipment 20 is provided with a protective pipe 40 for protecting the umbilical member 22 in the vicinity of a rotary structure controlled in the J2 axis. The protective pipe 40 is fixedly attached to the drum 28 driven for rotation in the J2 axis, and extends generally parallel to a rotation axis of the drum. In the vicinity of the top opening of the protective pipe 40, a first clamp member 42 is arranged to clamp the umbilical member 22 at a suitable position on the rotary structure in the J2 axis. In this regard, as shown in FIGS. 3A to 4, as the electric motor 34 and the reduction unit 38 are disposed near the rotary center in the J2 axis, the attaching position of the protective pipe 40 on the drum 28 is radially offset from the rotary center in the J2 axis.

Figure 5:
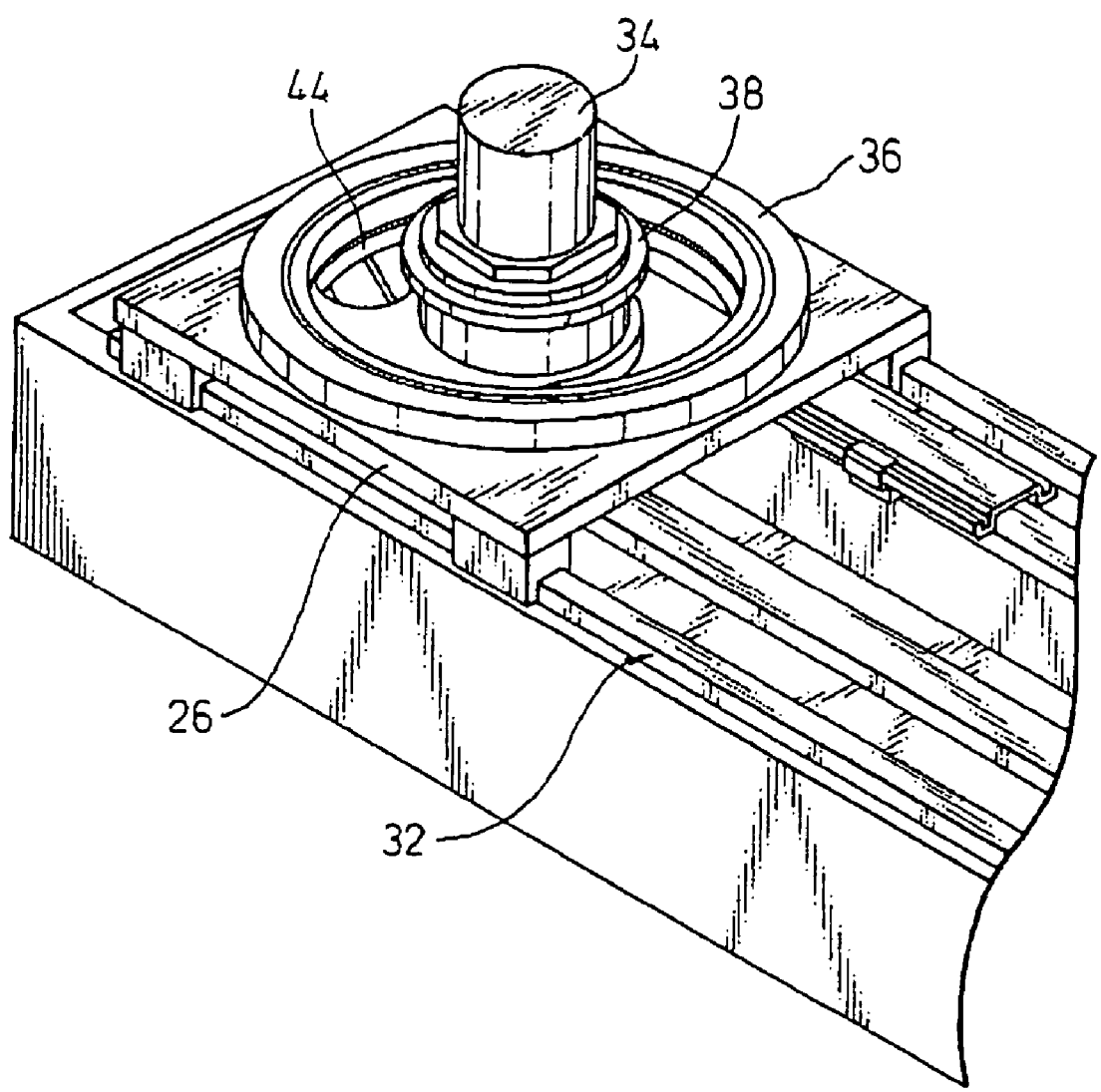
FIG. 5 is an enlarged perspective view showing a part of the structure of FIG. 2 with a rotary member of the J2 axis being omitted.
Figure 6:
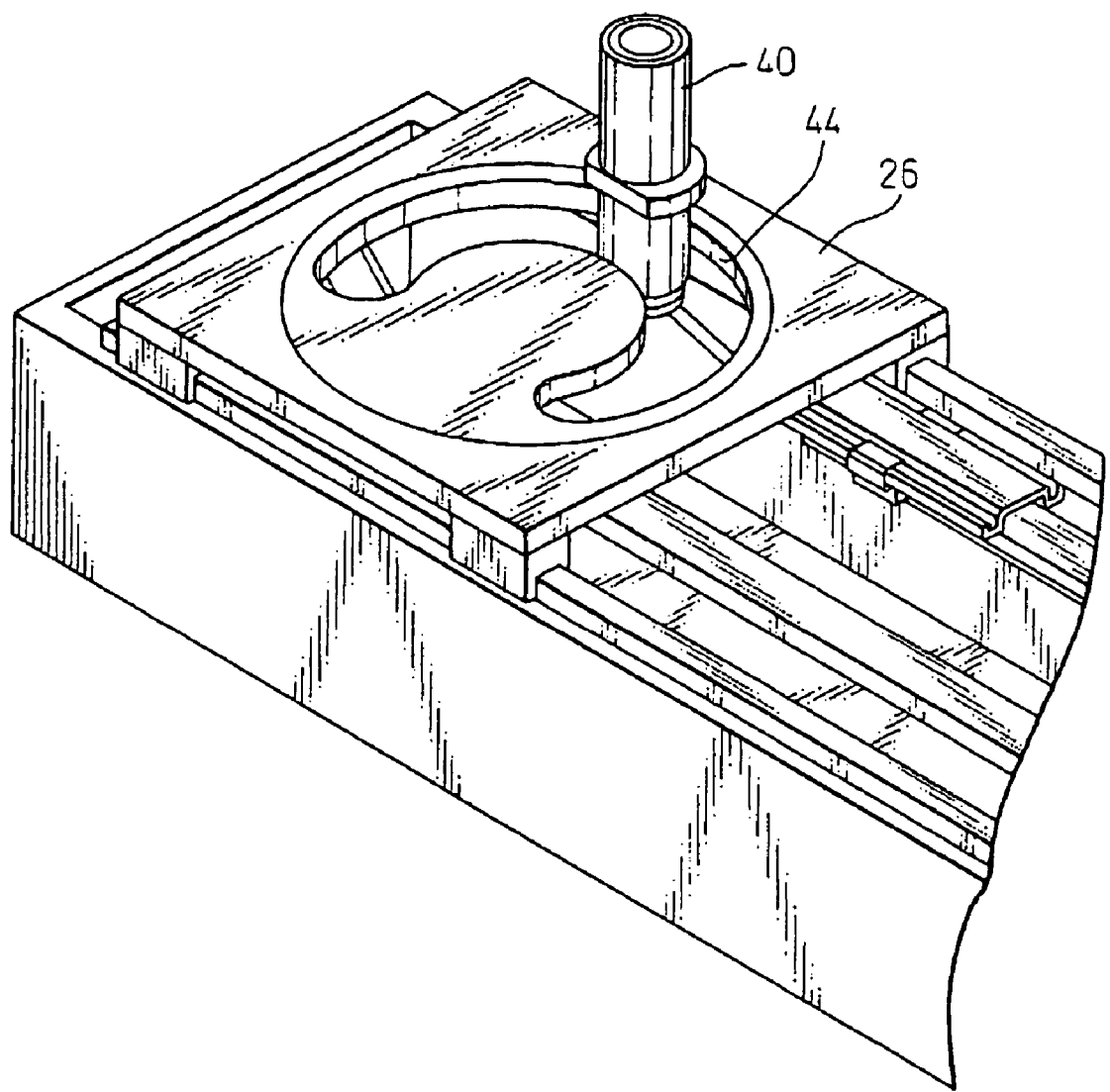
FIG. 6 is a perspective view showing a slider and a protective pipe in an exposed state with a driving structure of the J2 axis in the structure of FIG. 5 being omitted.

According to the above-described offset arrangement, the protective pipe 40 moves in revolution, relative to the slider 26, along an orbit having a radius corresponding to an offset distance, over a rotation angle determined in the J2 axis and about the rotary center in the J2 axis, during the rotating operation in the J2 axis. In order to allow this orbital motion, as shown in FIGS. 5 and 6, an arcuate opening guide 44 extending in correspondence to a rotation angle range in the J2 axis is provided in the slider 26. Thus, the protective pipe 40 moves along the opening guide 44 when the J2 axis rotates. Consequently, during a period when the J1 and the J2 axes operate simultaneously with each other, the protective pipe 40 generates such a motion that the linear motion of the slider 26 is superimposed with the above-described orbital motion.

In this way, the umbilical member 22 is directed from the base 12 to an inner upper position in the rotary structure in the J2 axis through the interior of the protective pipe 40, is clamped at this position by the first clamp member 42, and is further directed to operative members in the subsequent axes including the J3 axis. In this connection, it is expected that the protective pipe 40 is subjected to the above-described superimposed motion resulted from the linear and orbital motions and, therefore, the laying structure 24 of the distribution equipment 20 is provided with a characteristic configuration, as described below, to prevent the umbilical member 22 from being fully stretched by the above-described motion of the protective pipe 40 in the peripheral area of the J1 and the J2 axes.

Figure 7:
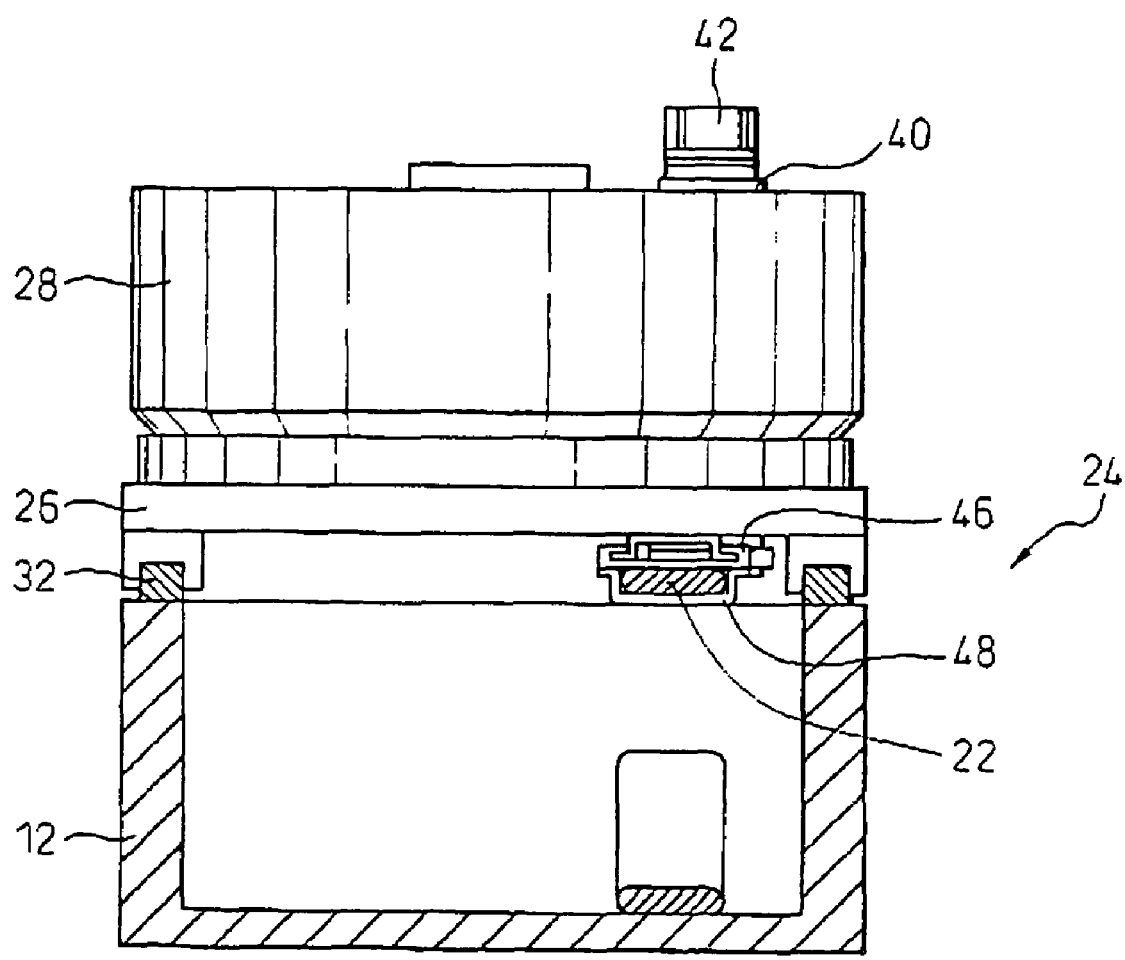
FIG. 7 is a sectional view taken along a line VII-VII in FIG. 3B.
Figure 8:
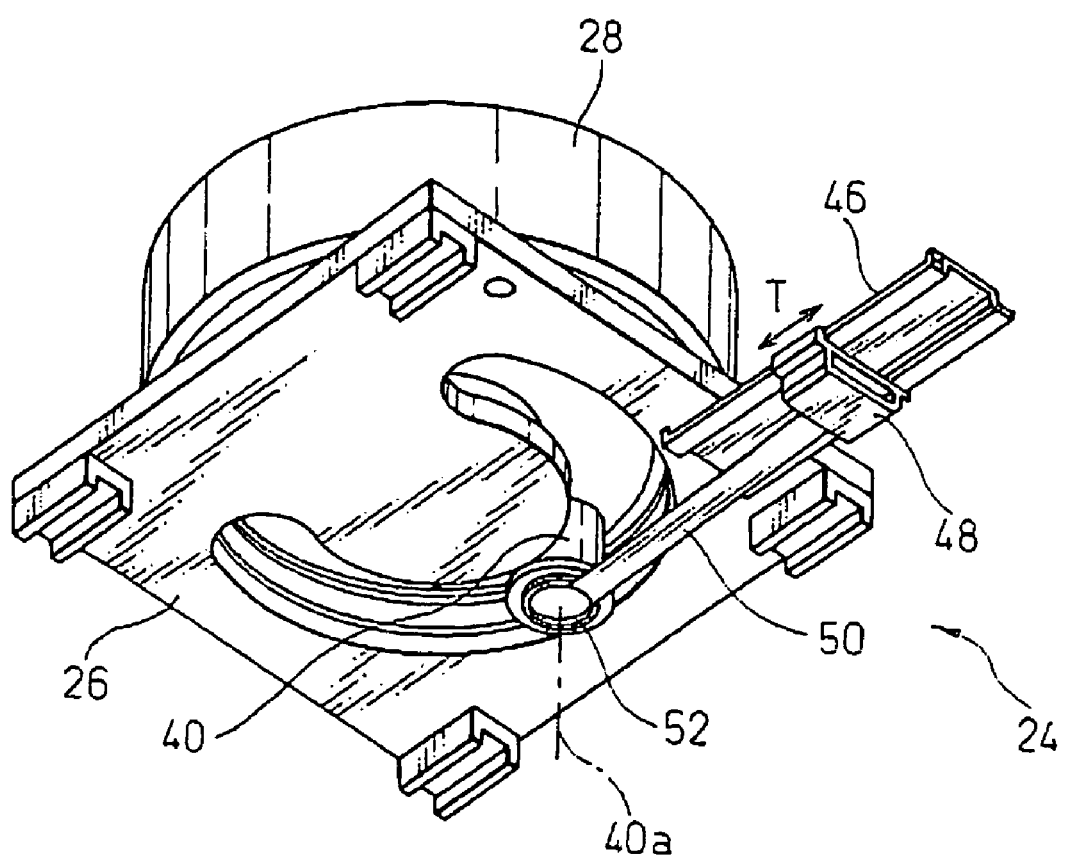
FIG. 8 is a perspective view showing a slider in the structure of FIG. 2 from the bottom side thereof to clearly show a connecting member.
Figure 9:
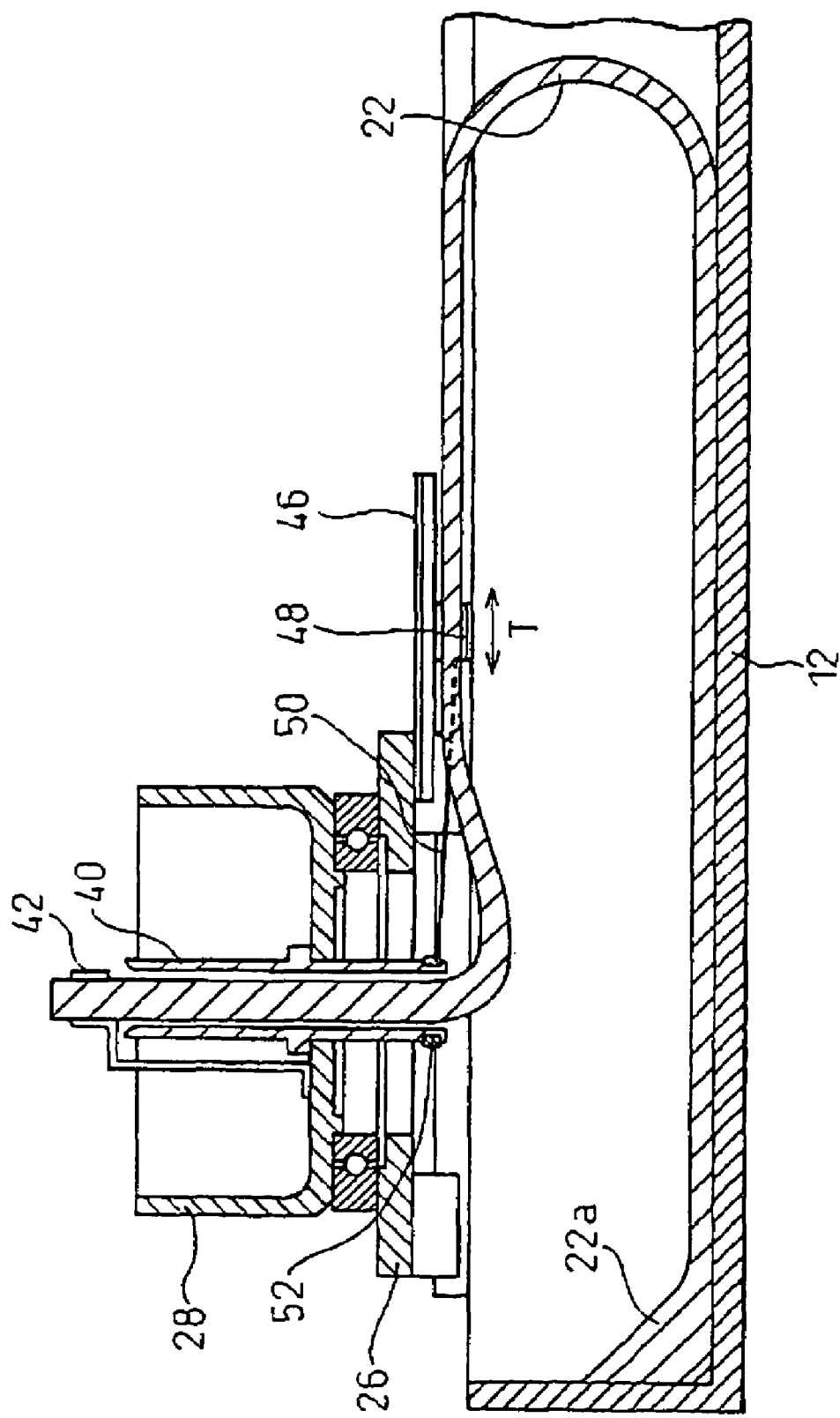
FIG. 9 is a sectional view taken along a line IX-IX in FIG. 3A.

As shown in FIGS. 7 to 9, the laying structure 24 includes a slide rail 46 arranged in the slider 26 and a second movable clamp member 48 attached to the slide rail 46 in such a manner as to be movable along the extending direction thereof (as shown by an arrow T). The umbilical member 22 accommodated in the base 12 is suitably branched into some pieces at one end 22a thereof (a left end in FIG. 9) to be connected to a connector (not shown), extends inside the base 12 with a U-shaped turn, and is clamped by the movable clamp member 48 at an intermediate position on the way toward the protective pipe 40. Further, the umbilical member 22 is introduced from the movable clamp member 48 into the protective pipe 40 through a bottom opening thereof, and is clamped by the clamp member 42 arranged near the top opening of the protective pipe 40 as already described.

The laying structure 24 further includes a connecting member 50 for mutually connecting the movable clamp member 48 and the drum 28 (particularly, the protective pipe 40) in a correlatively movable manner. More specifically, the connecting member 50 is fixedly attached at one end thereof to the movable clamp member 48 and, at the other end thereof, to a ring 52 provided rotatably about an axis 40a of the protective pipe 40 in a bottom region of the protective pipe 40. The connecting member 50 has a length slightly shorter than the corresponding length of the umbilical member 22 extending between the movable clamp member 48 and the ring 52. Thereby, the connecting member 50 transmits a force (or a torque) generating due to the movement of the drum 28 (or a second member) relative to the slider 26 (or a first member) to the movable clamp member 48, as a stretching or compressive force, so as to move the movable clamp member 48 along the slide rail 46 on the slider 26.

Preferably, the connecting member 50 is made of a material having flexibility in relation, at least, to a bending mode. Also, the connecting member 50 may have flexibility in relation to a torsion mode, as occasion demands. The connecting member 50 may have various forms, such as linear, flat or chain-like forms, and may also have a structure in which a plurality of links are connected to each other, provided that it has a desired flexibility and mechanical strength. In this regard, it is unfavorable that the connecting member 50 is easily stretchable by a tensile force. Also, the connecting member 50 of a chain or link structure may require flexibility in its entirety, irrespective of whether the individual chain or link element thereof has flexibility.

According to the above-described configuration, when the distance between the protective pipe 4C and the movable clamp member 48 increases due to the rotating operation in the J2 axis, the connecting member 50 is pulled and stretched before the umbilical member 22 is fully stretched, so as to move the movable clamp member 48 toward the protective pipe 40. Therefore, the umbilical member 22 is not substantially subjected to a tensile force. In other words, a tensile force, which is otherwise applied to the umbilical member 22 if no connecting member 50 is used, would be mainly borne by the connecting member 50. As the umbilical member 22 is not subjected to the tensile force, the change in the orientation (or the slack) of the umbilical member 22 is suppressed during the rotating operation in the J2 axis, and the umbilical member 22 is thus prevented from being significantly rubbed with a peripheral member such as the protective pipe 40.

Also, when the protective pipe 40 is shifted toward the movable clamp member 48 by the rotating operation in the J2 axis, the movable clamp member 48 moves smoothly along the slide rail 46 in a direction away from the protective pipe 40, in correspondence to the stiffness of both the connecting member 50 and the umbilical member 22. Thereby, the change in the orientation (or the slack) of the umbilical member 22 is suppressed. From this viewpoint, it is preferred that the movable clamp member 48 is designed to be supported on the slide rail 46 under a friction as low as possible, so as to be smoothly movable by a slight force. Thus, according to the robot 10 having the above configuration, it is possible to prevent the umbilical member 22 from being damaged during the operation of the robot mechanism 16 (particularly, in the J2 axis), and to increase the life of the umbilical member 22.

Figure 10:
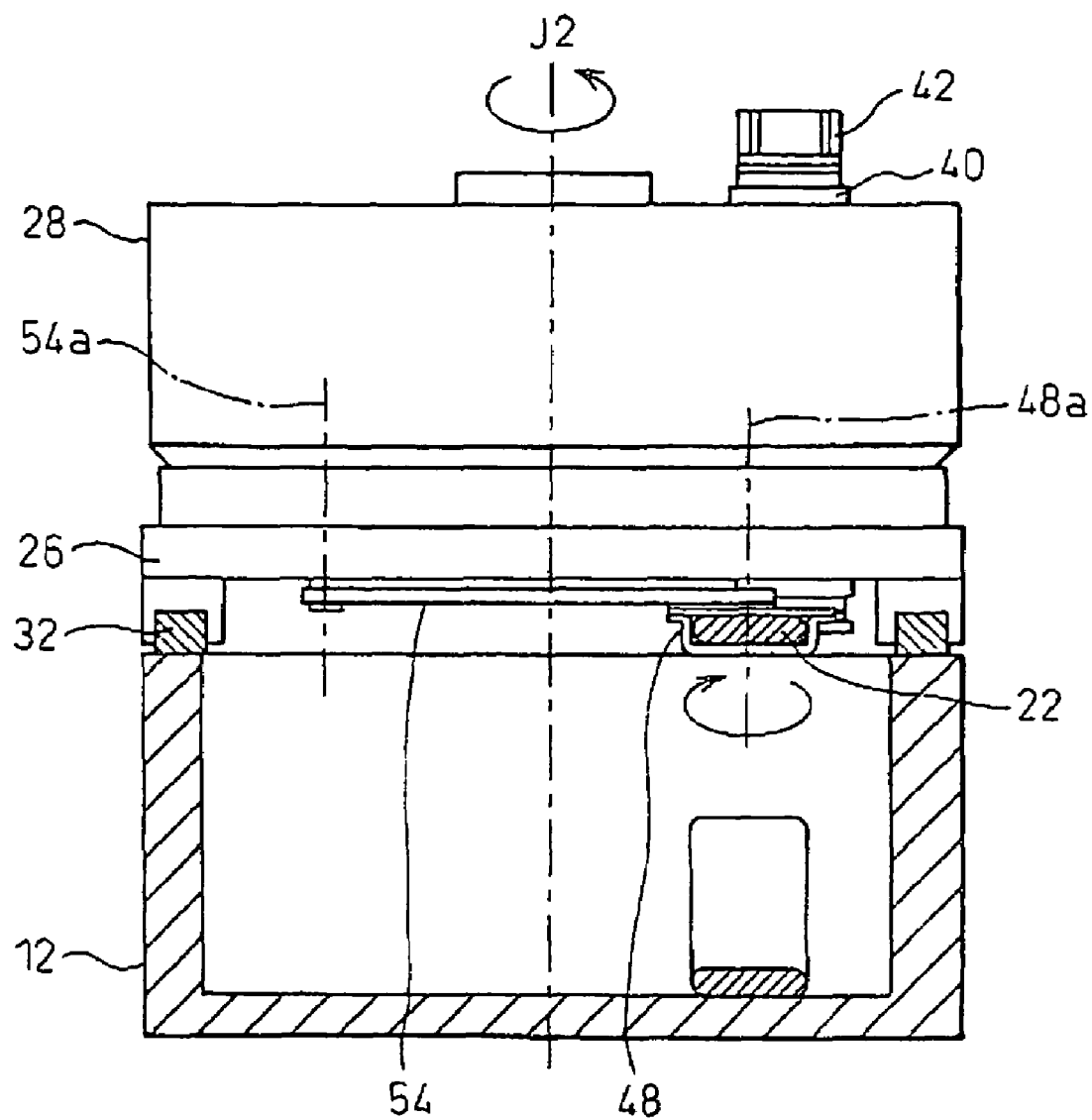
FIG. 10 is a sectional view, corresponding to FIG. 7, showing a peripheral structure of the J1 and the J2 axes in a robot, according to a second embodiment of the present invention.
Figure 11:
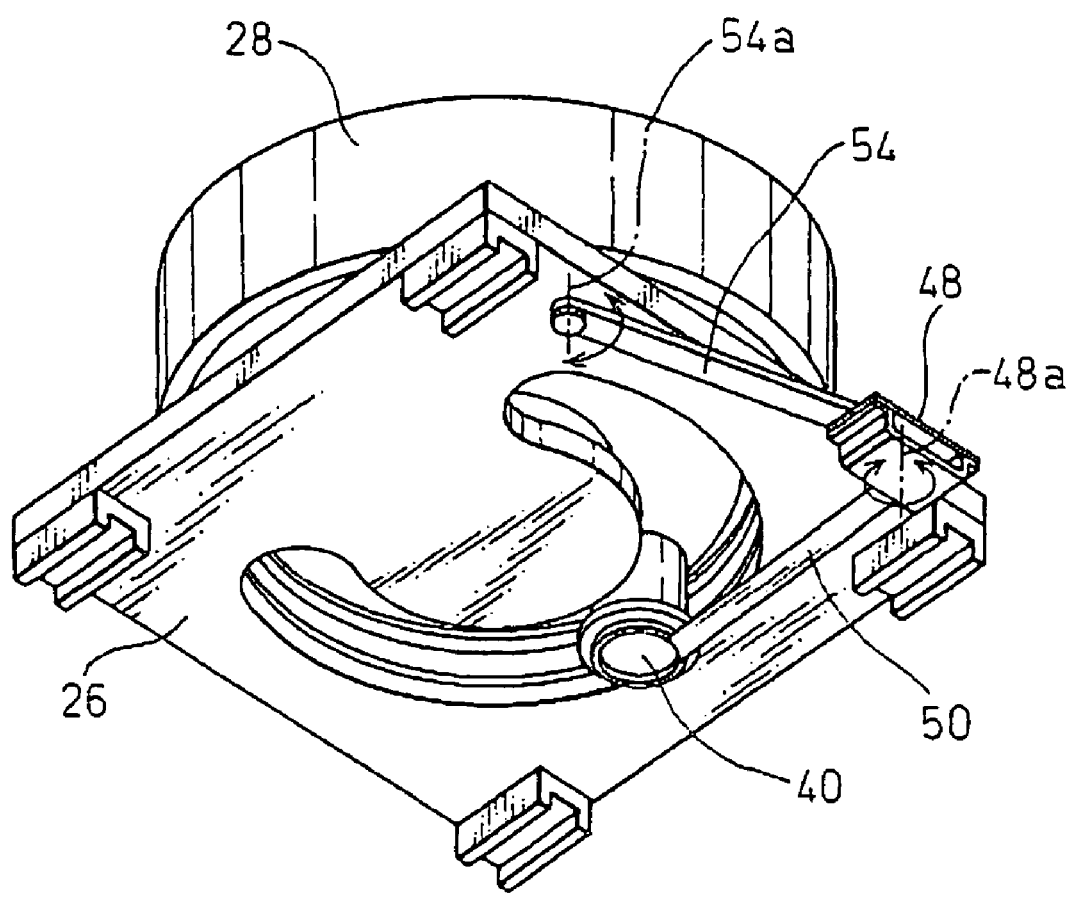
FIG. 11 is a perspective view, corresponding to FIG. 8, showing the structure of FIG. 10.
Figure 12:
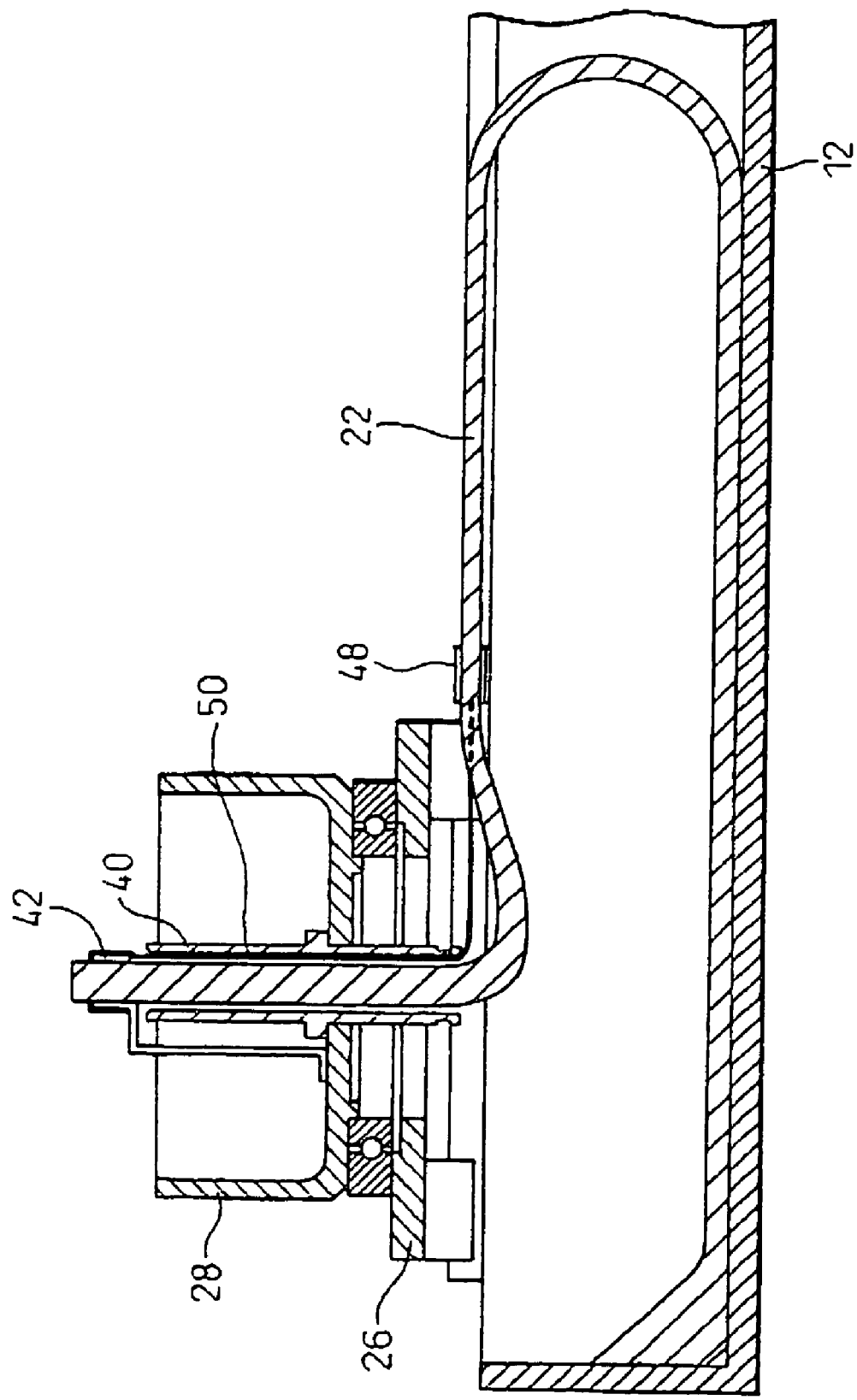
FIG. 12 is a sectional view, corresponding to FIG. 9, showing the structure of FIG. 10.

FIGS. 10 to 12 show a peripheral structure of the J1 and the J2 axes in a robot according to a second embodiment of the present invention. This robot is provided with a basic structure identical to that of the robot 10 according to the first embodiment, and thus the corresponding components are denoted by common reference numerals and the explanation thereof is not repeated.

A laying structure 24 of distribution equipment 20 in the second embodiment includes a support arm 54 pivotally attached to a slider 26, and a movable clamp member 48 supported in a rotatable manner at a distal end of the support arm 54. A pivot axis 54a of the support arm 54 on the slider 26 and a rotation axis 48a of the movable clamp member 48 on the support arm 54 are arranged in generally parallel to a rotation axis in the J2 axis at positions suitably apart from the latter.

The laying structure 24 further includes a connecting member 50 connecting the movable clamp member 48 to a drum 28 (particularly, a protective pipe 40) in a correlatively movable manner. The connecting member 50 is fixedly attached at one end thereof to the movable clamp member 48 and at the other end thereof to the clamp member 42 arranged near the top opening of the protective pipe 40. The connecting member 50 has a length slightly shorter than the corresponding length of the umbilical member 22 extending between the movable clamp member 48 and the clamp member 42. Thereby, the connecting member 50 transmits a force (or a torque) generated due to the movement of the drum 28 (or a second member) relative to the slider 26 (or a first member) to the movable clamp member 48, as a stretching or compressive force, so as to move the movable clamp member 48 on the slider 26 while accompanied with the pivoting motion of the support arm 54.

The above-described configuration is one which adopts the support arm 54 pivotingly shiftable on the slider 26, instead of the slide rail 46 in the first embodiment, and thus the movable clamp member 48 moves in a direction toward or away from the drum 28 (particularly, the protective pipe 40) while rotating relative to the slider 26 by a force transmitted through the connecting member 50. In this regard, in the second embodiment, the connecting member 50 having flexibility in relation to a torsion mode is used, because a torsion force is applied to the connecting member 50.

According to the above-described configuration, in the same manner as in the first embodiment, a tensile force is not substantially applied to the umbilical member 22 but is mainly applied to the connecting member 50 when the distance between the protective pipe 40 and the movable clamp member 48 increases due to the rotating operation in the J2 axis. Also, when the protective pipe 40 is shifted toward the movable clamp member 48 by the rotating operation in the J2 axis, the movable clamp member 48 smoothly moves in a direction away from the protective pipe 40, in correspondence to the stiffness of both the connecting member 50 and the umbilical member 22, while accompanying with the pivoting motion of the support arm 54. Thus, according to the robot of the second embodiment, it is possible to prevent the umbilical member 22 from being damaged during the operation of the robot mechanism 16 (particularly, in the J2 axis), and to increase the life of the umbilical member 22.

While the invention has been described with reference to specific preferred embodiments, it will be understood by those skilled in the art that various changes and modifications may be made thereto without departing from the spirit and scope of the following claims.

The invention claimed is:

1. A robot comprising:
a robot mechanism including a first member and a second member, said first member and said second member being movable relative to each other;
an umbilical member laid in said robot mechanism and extending between said first member and said second member;
a clamp member movably provided in said first member to clamp said umbilical member; and
a connecting member for connecting said clamp member to said second member in a correlatively movable manner, said connecting member transmitting a force generating due to a movement of said second member relative to said first member, to move said clamp member in said first member.

2. A robot as set forth in claim 1, wherein said connecting member has flexibility.

3. A robot as set forth in claim 1, wherein said movement of said second member for generating said force is a rotating movement relative to said first member.

4. A robot as set forth in claim 1, wherein said clamp member is provided in said first member in a linearly movable manner.

5. A robot as set forth in claim 1, wherein said clamp member is provided in said first member in a rotatable manner.

6. A robot as set forth in claim 5, further comprising a support member rotatably supporting said clamp member, said support member being pivotably attached to said first member.

* * * * *